United States Patent
Van Den Wouwer

(10) Patent No.: US 9,819,639 B2
(45) Date of Patent: Nov. 14, 2017

(54) DEVICES AND METHOD FOR ASSIGNING NETWORK ADDRESSES

(71) Applicant: TELEVIC RAIL NV, Izegem (BE)

(72) Inventor: Dirk Van Den Wouwer, Melsele (BE)

(73) Assignee: TELEVIC RAIL NV, Izegem (BE)

( * ) Notice: Subject to any disclaimer, the term of this patent is extended or adjusted under 35 U.S.C. 154(b) by 460 days.

(21) Appl. No.: 14/381,389

(22) PCT Filed: Dec. 5, 2012

(86) PCT No.: PCT/EP2012/074443
§ 371 (c)(1),
(2) Date: Aug. 27, 2014

(87) PCT Pub. No.: WO2013/127479
PCT Pub. Date: Sep. 6, 2013

(65) Prior Publication Data
US 2015/0134802 A1 May 14, 2015

(30) Foreign Application Priority Data

Feb. 27, 2012 (EP) ..................................... 12157078

(51) Int. Cl.
*H04L 29/12* (2006.01)
*H04L 12/413* (2006.01)
*B61L 15/00* (2006.01)

(52) U.S. Cl.
CPC ............ *H04L 61/20* (2013.01); *H04L 12/413* (2013.01); *H04L 61/2038* (2013.01);
(Continued)

(58) Field of Classification Search
CPC ..... H04L 61/20; H04L 61/103; H04L 61/609; H04L 61/2007; H04L 61/2038;
(Continued)

(56) References Cited

U.S. PATENT DOCUMENTS 6,167,446 A * 12/2000 Lister ...................... G06F 9/50
709/202
8,570,877 B1 * 10/2013 Bayar ................ H04L 41/0681
370/241.1
(Continued)

FOREIGN PATENT DOCUMENTS

CH WO 2011095857 A1 * 8/2011 ............. H04L 12/10
DE 19621272 A1 11/1997
(Continued)

OTHER PUBLICATIONS

Dutcher, "IP Addressing: Playing the Numbers. IP addresses are in short supply—but there are ways to ease the crunch," Data Communications, vol. 26, No. 4, Mar. 21, 1997.
(Continued)

*Primary Examiner* — Krista Zele
*Assistant Examiner* — Michael A Chambers
(74) *Attorney, Agent, or Firm* — Workman Nydegger

(57) ABSTRACT

A switching device comprises a terminal pair arranged for signal transmission and reception. Circuitry is adapted for generating a stimulus signal to a plurality of network devices forming a daisy chain and for receiving a response signal to the stimulus signal. The circuitry is arranged for deriving from at least the response signal an indication of a network device of the plurality being operational or not. Processing means is arranged for assigning a location-based network address to the network device of the plurality considering the derived indication.

7 Claims, 3 Drawing Sheets

(52) U.S. Cl.
CPC ......... *H04L 61/609* (2013.01); *B61L 15/0072* (2013.01); *H04L 61/2007* (2013.01)

(58) Field of Classification Search
CPC ....... H04L 12/06; H04L 12/28; H04L 12/413; H04L 67/12; H04L 67/29; H04L 41/12; B61L 15/0072
USPC .......... 370/255; 709/201–203, 220–226, 245
See application file for complete search history.

(56) References Cited

U.S. PATENT DOCUMENTS

| | | | | |
|---|---|---|---|---|
| 8,645,509 | B2* | 2/2014 | Carriere | H04L 12/4641 370/254 |
| 8,755,307 | B2* | 6/2014 | Shigeeda | H04L 29/12028 370/255 |
| 8,935,022 | B2* | 1/2015 | Cooper | B61L 15/0036 180/14.1 |
| 2003/0095520 | A1* | 5/2003 | Aalbers | H04L 29/06 370/338 |
| 2004/0071164 | A1* | 4/2004 | Baum | H04L 29/12018 370/469 |
| 2005/0097255 | A1 | 5/2005 | Barenys et al. | |
| 2005/0172024 | A1* | 8/2005 | Cheifot | H04L 29/12009 709/225 |
| 2007/0047436 | A1* | 3/2007 | Arai | H04L 49/351 370/219 |
| 2007/0165658 | A1* | 7/2007 | Mutoh | H04L 12/4637 370/403 |
| 2008/0032711 | A1* | 2/2008 | Macht | H04H 20/62 455/456.5 |
| 2008/0186955 | A1* | 8/2008 | Puckett | H04M 3/5116 370/352 |
| 2009/0279454 | A1* | 11/2009 | Wacker | H04L 29/12283 370/255 |
| 2010/0135151 | A1* | 6/2010 | Johnson | H02M 3/33576 370/217 |
| 2012/0089713 | A1* | 4/2012 | Carriere | H04L 12/4641 709/222 |
| 2013/0094352 | A1* | 4/2013 | Bouhal | H04L 12/40176 370/225 |
| 2013/0114614 | A1* | 5/2013 | Tran | H04L 12/10 370/401 |
| 2015/0217790 | A1* | 8/2015 | Golden | B61L 15/0072 701/19 |

FOREIGN PATENT DOCUMENTS

| | | |
|---|---|---|
| DE | 19833462 A1 | 1/2000 |
| DE | 102007044820 A1 | 4/2009 |
| EP | 0983905 A2 | 3/2000 |
| EP | 1694035 A1 | 8/2006 |
| WO | 2009014581 A1 | 1/2009 |
| WO | 2011095857 A1 | 8/2011 |

OTHER PUBLICATIONS

European Search Report for corresponding European Application No. 12157078.2, dated Aug. 6, 2012.
International Search Report for corresponding International PCT Application No. PCT/EP2012/074443, dated Mar. 26, 2013.
Partial European Search Report for corresponding European Application No. 12157078.2, dated Apr. 19, 2012.

* cited by examiner

DEVICES AND METHOD FOR ASSIGNING NETWORK ADDRESSES

FIELD OF THE INVENTION

The present invention is related to the field of computer network devices for reliable packet routing in transportation vehicles. More in particular, it relates to solutions for assigning network addresses in a computer network provided in a transportation vehicle.

BACKGROUND OF THE INVENTION

Economics of scale make Ethernet (IEEE 802.3) and IP (internet protocol) technology (as defined by the Internet Society and the Internet Architecture Board, basic IP protocol being RFC 791) an interesting solution for all digital communication, wired and wireless, large and limited bandwidth, real-time traffic, reliable transmissions, etc . . .

An essential element of digital networking is the addressing, which follows a layered approach as in OSI (Open Systems Interconnection standard of the ISO) network layering.

At the data link layer Ethernet MAC (Media Access Control) addresses are used. They are used between machines on the same local area network. At the network layer IP addresses are used. They are known and used by the endpoints of the connection on an internet. Router nodes on the network connect local area networks to route IP datagrams to their destination, based on routing information.

While the original purpose was to have a unique IP address for each end node in the network, IP network address translation (RFC 1631) has been introduced to allow for networks with end nodes that have IP addresses that are not globally known or unique, to connect to a global internet by having their IP address in IP datagrams rewritten to a globally assigned unique IP address. This defines a hierarchy in IP addressing. The hierarchy is limited to two levels: global addresses and local addresses. No provisions are available for a further split up of the local addresses.

The IP network architecture is robust to configuration changes, based on auto-learning mechanisms with time-outs on learned information. For the local area network this is the ARP protocol (address resolution protocol RFC 826) and for the global network, the routing protocols (such as the OSPF protocol RFC 1247). The time scale to which these protocols react to configuration changes ranges from several minutes to several hours. During these times inconsistencies are possible. Shortening these times would either jeopardise the robustness of the network or involve a large messaging overhead.

The domain name system (DNS RFC 1034 and 1035) adds a logical addressing layer on top of the IP addresses. Apart from the convenience of textual addressing it adds flexibility, especially to add multiple overlay addressing hierarchies, possibly referring to the same IP addresses. The DNS addressing mechanism has been a preferred addressing layer to render configuration changes. Dynamic update in DNS (RFC 2136) allows for synchronous instead of periodic update of the addressing information in the DNS database. Here also the lower timeouts encompass an extra messaging overhead. More specifically, removing the possibility of cached DNS information adds extra delay to the connection set-up. A more severe limitation of this approach is that all client software has to obey this no-caching policy and that the configuration change only propagates to new connections. Again this could be coped with in the client applications, but this would require specific software to be added and would also involve extra messaging.

In the paper '*IP addressing playing the numbers. IP addresses are in short supply*' (W. Dutcher, Data Communications, vol. 26, no. 4, Mar. 21, 1997) the author discusses the shortage of IP addresses. One way to translate private addresses into public addresses when they are sent to the Internet, is to use network address translation (NAT) in routers or firewalls. Using NAT all private addresses of outbound traffic (towards the Internet) are taken and the source addresses are converted. For inbound traffic (towards the internal network) the process works in reverse.

More and more trains are nowadays equipped with 100 Mbit/s (or faster) Ethernet backbones. On board devices communicate with each other by means of different protocols using the Ethernet backbone (UDP, TCP/IP, etc . . . ). For addressing the different devices, IP addresses are being used. Due to reasons related to network availability the use of trainwide (redundant) dynamic host configuration protocol (DHCP) servers is dissuaded. A reliable network topology discovery with deterministic, logical and location based IP address assignment is required and is indeed available on the market now.

Document EP1694035-A1 discloses a solution for reliable packet routing in a hierarchical reconfigurable network. A transportation vehicle (e.g. a train) is considered comprising a plurality of 'cars'. Each car comprises a computer network referred to as a sub-network. Individual cars can be combined in sub-compositions (units) whereby the sub-networks get concatenated. The number of cars in such a sub-composition as well as the arrangement of the cars, is variable. Hence, the reconfigurable network has a dynamic nature. Several sub-compositions may be combined variably and interconnected to form larger compositions. The full vehicle composition is arranged with a network composed of sub-networks defined at lower level in the hierarchy. A hierarchical addressing scheme is applied, wherein the address is adapted based on the hierarchy level of the destination network. The proposed solution in EP1694035 allows for the assignment of IP addresses in a logical way without human intervention.

However, there remains an unsolved problem about dynamic host configuration for daisy chain nodes. The major advantage of using daisy chained network topologies is clearly the reduced amount of wiring that is required as compared to other topologies. Hence, there is a reduction in cost and weight. A node is to be understood as a device with one Ethernet input and one Ethernet output, whereby switching means are provided to short the input and/or output in case of a failure. The problem is illustrated in FIG. 1. The figure depicts two Ethernet nodes (299,399). Each of those nodes is composed as follows. The node comprises or is connected to an application (200) via an Ethernet switch (210) adapted for exchanging communication data with the application (200) and the Ethernet network (400). This switch allows traffic from the application to be communicated to the Ethernet network (400) and receives data addressed to the application and forwards this accordingly. Additionally, this device forwards packets between the IN and the OUT ports if the data packages are not uniquely addressed to the application. If for some reason (power failure, software crash, . . . ) the application is no longer operational (or was not operational since the start-up) switching means (220) are closed automatically to ensure that communication is still possible from the backbone (900) of the train over the local backbone switch or router (100) to the devices in the daisy chain which are still operational. In the example illustrated in FIG. 1 this is node 399. Note that the dashed line connecting two switch means (220) indicates that those switching means are interconnected and open and close simultaneously at all times. The switching means are typically implemented as a relay, as shown in FIG. 1. Other circuitry to connect or disconnect the Ethernet switch from the daisy chain could be applied as well (e.g. use of a solid state switch).

Following the addressing mechanism described in EP1694035 a node receives an IP address which is a function of the train unit number, car number and type of node and switch port number. Note that hereby a transportation vehicle with hierarchical configuration is considered as in the above-mentioned document EP1694035. This allows addressing Ethernet nodes in a logical manner, depending on how a train has been assembled (i.e. depending on the topology), without human intervention. In normal condition node (299) at location (1) should be assigned address IP(1) and node (399) at location (2) should receive address IP(2). This has been depicted as case A in FIG. 1. Because of the nature of the Ethernet switch (210, 310), without provisions, the backbone switch/router (100) will not be able to retrieve the location of the nodes in the daisy chain. Even specific software solutions or solutions based on Dynamic Host Configuration Protocol (DHCP) option 82 do not solve the problem when in the initial state one or more daisy chained nodes are malfunctioning at the time IP addresses are assigned to the different nodes. In case of FIG. 1 the switch only sees one node (399) and assigns the first IP address IP(1) reserved for the chain at port (110) to the second node (399) in the chain (represented as Case B in FIG. 1). The aim however was the assignment of addresses as being depicted in Case A in FIG. 1. Hence, in case of a malfunctioning node the requirement that an IP address be location based is immediately broken.

In the prior art the use of MAC/IP tables in routers is known, but such a solution suffers from the drawback of requiring manual configuration if the network topology changes or network devices are replaced.

Solutions based on Dynamic Host Configuration Protocol (DHCP) option 82, whereby topology is taken into account, require special hardware. As stated, this method does not solve the problem of malfunctioning devices in the chain during the assignment process. Application US2009/0279454, which is also concerned with unambiguous assignment and IP address allocation, provides an example.

Patent document EP 0983905 B1 discloses a circuit arrangement for decoupling an electronic device from a data line in a motor vehicle over which information is exchanged.

SUMMARY OF THE INVENTION

It is an object of embodiments of the present invention to provide for a solution that assigns location based IP addresses in a reliable way.

The above objective is accomplished by the method and devices according to the present invention.

In one aspect the invention relates to a method for assigning with a switching device a logical, location-based network address to a network device in a network comprising a plurality of network devices forming a daisy chain, whereby said network devices comprise means for exchanging communication data, or a communication device, with an application, first connection means, or a first connection device, arranged for connecting in a first position a first terminal pair with the means for exchanging communication data, second connection means, or a second connection device, arranged for connecting in a first position a second terminal pair with the means for exchanging communication data and an electrical circuit providing a connection with at least the first or the second connection means so that a connection can be established between the electrical circuit and at least one port of the first or second terminal pair when the first or second connection means is in a second position. The method comprises the steps of:

detecting, based on a response signal received from the network, a change in topology of said network comprising a plurality of network devices transmitting a command instructing at least one network device of said plurality having no location-based network address to open the second connection means, receiving a request for assigning a network address from a network device of the at least one network device having no location-based network address yet, assigning a location-based network address to the network device from which the request was received, taking into account the number of electrical circuits that are detected by said switching device, said number being derived from the response signal.

A response signal is received at a switching device (router) from the network comprising the plurality of network devices. From the response signal is detected whether a change in topology of the network comprising a plurality network devices has occurred. From the response signal it is also possible to derive the number of said electrical circuits seen by the detection circuitry in the switching device. Next, the switching device broadcasts a command instructing the at least one network device to open the second connection means. The switching device then receives in reply a request for assigning a network address from one of the network devices having no location-based network address yet, namely from the network device closest to the switching device in the daisy chain. Then a location-based network address can be assigned to the network device from which the request was received, whereby the number of electrical circuits seen by the switching device is taken into account, said number being derived from the response signal. In this way it is possible to distribute network addresses while accounting for malfunctioning nodes in the daisy chain. Due to the presence of the electrical circuit in the network devices forming the daisy chain, a solution for reliable network address assignment is available.

In a preferred embodiment the first and second connection means operate independently from each other. This is different from what is known from prior art solutions and is particularly advantageous when the procedure for assigning a network address is performed, as detailed below.

In a preferred embodiment the first and second connection means the application are controlled by the application.

In principle any electrical circuit is suitable that is not powered by the 'local system', i.e. by the network device itself. It is essential that the electrical circuit remains visible for the switching device in case the network device is out-of-order due to a power failure or another hardware or software failure. The electrical circuit is a passive circuit or a circuit with external power supply. In one embodiment the electrical circuit is simply an electrical component like a resistor or capacitance. In that case the electrical component gets connected via the connection means to the terminal pairs at either side of the network node. In an alternative embodiment the electrical circuit is an active electronic circuit (e.g. a serial flash powered by the IN port).

In a second aspect the invention relates to a switching/routing device comprising a terminal pair arranged for signal transmission and reception, circuitry adapted for generating a stimulus signal to a plurality of network devices forming a daisy chain and for receiving a response signal to the stimulus signal, whereby said circuitry is further arranged for deriving from at least the response signal an indication of a network device of the plurality being operational or not, processing means arranged for assigning a location-based network address to the network device of the plurality taking into account the derived indication.

The above switching device indeed allows assigning location-based network addresses. Such backbone switching/routing device is capable of generating a signal to be transmitted to the daisy chained network devices and of receiving the corresponding response signal. From the received signal can be detected whether a network device is operational or not. Based on this information an algorithm performed in the processing means can determine the position of the network device and a network address reflecting that position is assigned to the network device.

In an advantageous embodiment the detection circuit comprises a power supply and is adapted for performing a current measurement.

In a preferred embodiment the algorithm running in the processing means is capable of determining the number of malfunctioning network devices in the daisy chain.

In another aspect the invention relates to a network device comprising a first terminal pair for connecting a first transmit/receive wire pair, a second terminal pair for connecting a second transmit/receive wire pair, means for exchanging communication data with an application, said communication data comprising a request for obtaining a network address, first connection means arranged for establishing in a first position connection between said first terminal pair and said means for exchanging communication data, second connection means arranged for establishing in a first position connection between said second terminal pair and said means for exchanging communication data.

The network device further comprises an electrical circuit in connection with at least the first or the second connection means, so that a connection can be established between the electrical circuit and at least one port of the first or second terminal pair when the first or second relay means is in a second position. Most preferably the network device is implemented as an Ethernet node.

A daisy chain of such network devices indeed allows assigning location-based network addresses in a reliable way. Due to the electrical circuit which is still 'visible' in absence of any power supply in the network device, it is possible to account for malfunctioning Ethernet nodes (network devices) in the chain. In case of a malfunctioning node the connection means is switched to a position wherein the electrical circuit is connected to the network. Due to the switching of the connection means, typically—but not necessarily—a relay, IN ports are immediately connected to OUT ports and an interruption of the chain is avoided. Further, the presence of the electrical circuit allows determining the position where the failure occurred. A backbone switching/router device, aware of which electrical circuit is actually applied, can derive from a measured electrical quantity how many malfunctioning nodes are in the path between the backbone switching/router device and the network device (e.g. an Ethernet node) to which a network address is to be assigned. From this information the position of the network device in question can be determined and hence, a network address related to the location and logical sub network can be assigned.

The invention also relates to a transportation vehicle comprising a switching device as previously described and a plurality of network devices as described above. The transportation vehicle is advantageously a train.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

DETAILED DESCRIPTION OF ILLUSTRATIVE EMBODIMENTS

Figure 1:
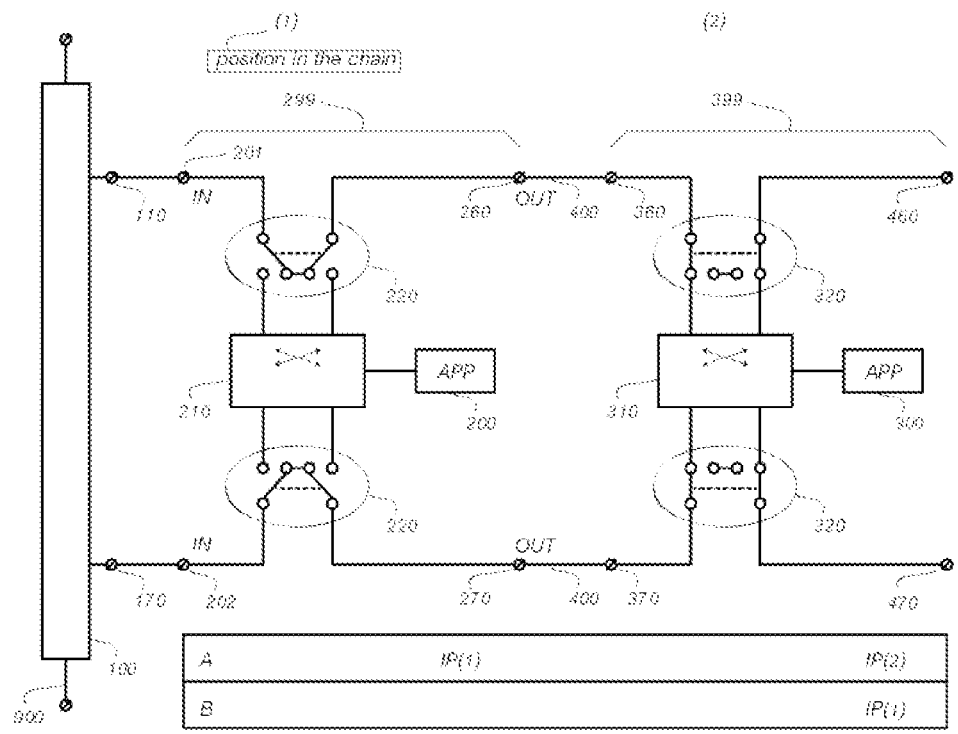
FIG. 1 represents two standard Ethernet nodes in a daisy chain as known in the prior art.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The proposed solution involves an adaptation of the architecture of the network nodes (Ethernet nodes) forming a daisy chain. Also the backbone switching device (router) undergoes a modification. Using the adapted network nodes and switching device a procedure is proposed to assign location-based network addresses to the nodes in the daisy chain.

Figure 2:
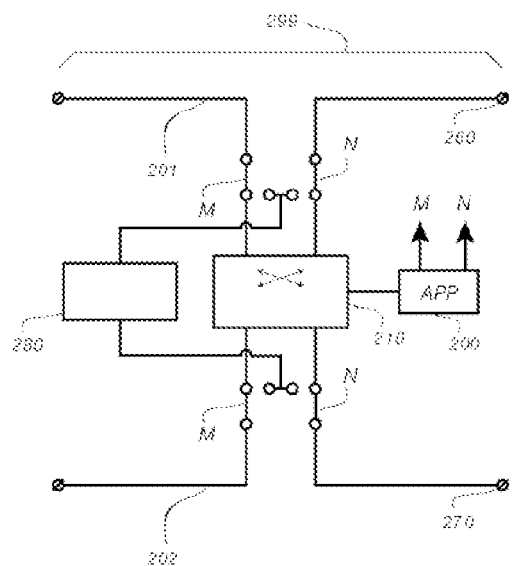
FIG. 2 represents an embodiment of a network device according to the invention.

FIG. 2 illustrates a network node according to an embodiment of the invention. In network node (299) a first (M) and a second (N) connection device or relay means form four relays (two by two) handled by the application (200). In a first position the first relay means (M) (illustrated in FIG. 2) establishes a connection between the transmit/receive wire pair IN (201,202) and application 200 via a communication device (210) arranged for exchanging communication with the application. This device (210) is for example an Ethernet switch. The application (200) can be, but is not restricted to, a CCTV camera, (audio) alarm panel, digital information screen, etc. Typically, application (200) can be seen as comprising some hardware abstraction, system software (among which one or more operating system(s) or low end 'scheduler(s)' comprising the software handling network communication) and software responsible for the correct execution of required functionality (the 'actual' application). Similarly, in a first position the second relay means (N) makes a connection between the transmit/receive wire pair OUT (260,270) and application 200 via said device (210). The relays M and N can be closed and opened independently from each other, so that the ports at the IN and OUT side separately can be connected or not. It is to be noted that the relays M and N shown in FIG. 2 are just an example and that in alternative embodiments other switching means (e.g. a solid state switch) can be used as well to establish the connection between a terminal pair and device 210. Additionally an electrical circuit 280 (in the particular example of FIG. 3 a simple resistor) is provided. When the first relay means (M) is moved to a second position, a connection between the two ports of the terminal pair is created via the electrical component. The same holds for the second relay means N: when brought into a second position the relays make a connection between the two ports of the OUT terminal pair via the electrical circuit.

It is however not required to use an electrical circuit that is connectable to both ports of a terminal pair. Indeed, in an alternative embodiment an active device can be employed. This circuit is not powered by the network node itself, but is powered externally. In one embodiment, the circuit is powered by means of the IN port terminal pair.

In general any electrical circuit can be used which is not powered locally by the Ethernet node. It is essential that the circuit remains 'visible' to the backbone switching/routing device assigning the network addresses in absence of any power supply. Only then logical and location-based IP addresses can be distributed in a reliable way.

Figure 4:
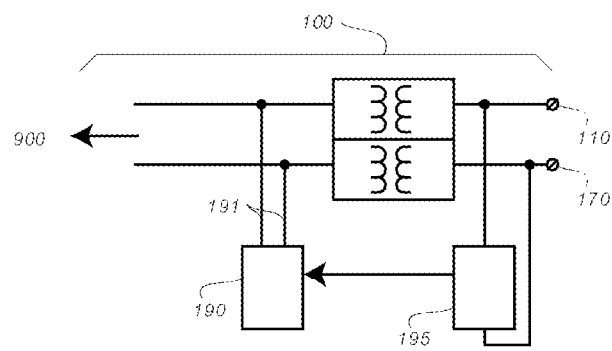
FIG. 4 represents a general scheme of a switching device according to the invention.

FIG. 4 shows a generic scheme of a backbone switch/router (100) provided with the proposed additional circuitry according to the invention. This is the device in charge of distributing network addresses to the Ethernet nodes that form a daisy chain. Via the terminal pair (110,170) a connection with the IN pair of an Ethernet node (299) can be established. Communication from the backbone of the transportation vehicle is possible via connection 900. The processor (190) is responsible for assigning the (logical and location-based) IP addresses. Via its output (191) it is possible to have access to the daisy chain of Ethernet nodes connected to the backbone switching/routing device (100). The switching device (100) comprises circuitry (195) for generating stimuli towards the electrical circuits (280) in each malfunctioning node connected to the daisy chain. Additionally, it is arranged to detect the electronic circuit (280) in each malfunctioning node in the chain. The detection circuitry communicates the results of this measurement to the processor (190). Neither the stimuli, nor the detection influence in any way the functional operation, i.e. the communication between nodes (299, 399) and backbone (900).

Figure 3:
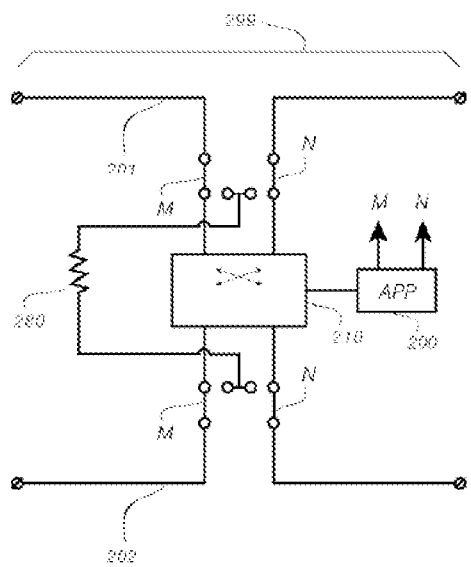
FIG. 3 represents an embodiment of a network device according to the invention using a resistor as electronic circuit.
Figure 5:
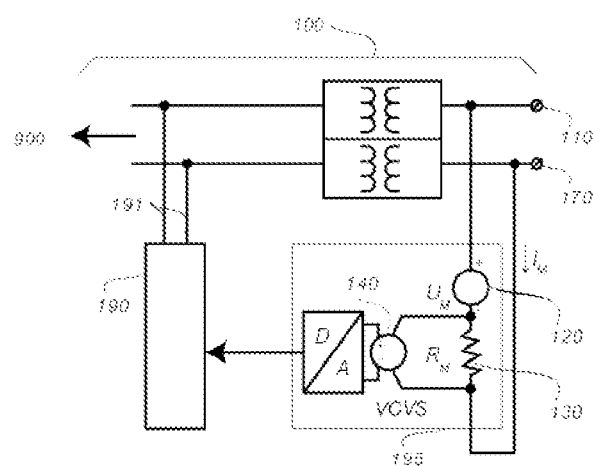
FIG. 5 represents one embodiment of a switching device according to the invention.

In the particular embodiment shown in FIG. 5 a power supply (120) is provided between ports 110 and 170. In this embodiment the electrical circuit (280) can simply be a resistor (as shown in FIG. 3). A sense resistor $R_M$ (130) is used to measure the DC current flowing in the chain. The resistor values of both resistors 280 and 130 are known in the processor (190) and available to the addressing algorithm running in the processor. The measured current value is made available to the processor by means of a digitized output of the voltage controlled voltage source (140) in FIG. 5. The current is a measure for the number of connected, malfunctioning Ethernet nodes between the routing device (100) and the next Ethernet node to be assigned an IP address.

Many alternative solutions can be envisaged. In the case of an embodiment using a capacitance as electrical circuit (280), instead of current, charging time can be a measure for the number of connected malfunctioning network nodes.

Now is explained how the network address assignment is actually performed. As already mentioned, the described algorithm is running in the processor (190).

The algorithm comprises of a number of consecutive steps, which are executed when the local backbone switch/router (100) detects a change in the topology of the daisy chain and if reassignment is required. A topology change can be detected by a change in number of electrical circuits (280) seen by the detection circuitry (195) compared to the previously detected topology. Additionally, if a new device was added to the chain, which holds no valid IP address at that time, it broadcasts its presence on the chain. A valid address is a logical address, obtained using e.g. the mechanism described in EP1694035, wherein the location of the network device in the daisy chain has been taken into account. The broadcast signal is detected by the processor (190) in the switch/router (100). The processor then starts the algorithm.

In a first step of the algorithm, the backbone switch/router processor (190) broadcasts a command to all nodes (299, 399) on the daisy chain, which have no valid IP address assigned yet, to open their respective switching means N. After this action, the applications (200) request an address from the processor. At that moment the switch/router (100) only receives one valid request from the functional Ethernet node closest to the backbone switch, which does not hold a valid address yet. If no request for address assignment is received by the switch/router, the end of the chain has been reached, and the address assignment procedure ends here. If the IP address previously assigned to said node closest to the backbone switch was IP(f(p)), where f(p) is function of the physical location in the chain (p), the processor now assigns an IP address which equals IP(f(p+q+1)). The newly assigned IP address is function of the previously assigned IP address IP(f(p)), the difference (q) between the number of detected malfunctioning nodes and the number of detected malfunctioning nodes if address IP(f(p)) increased by one were assigned. This process is repeated until all functional nodes have received their IP address.

Figure 6:
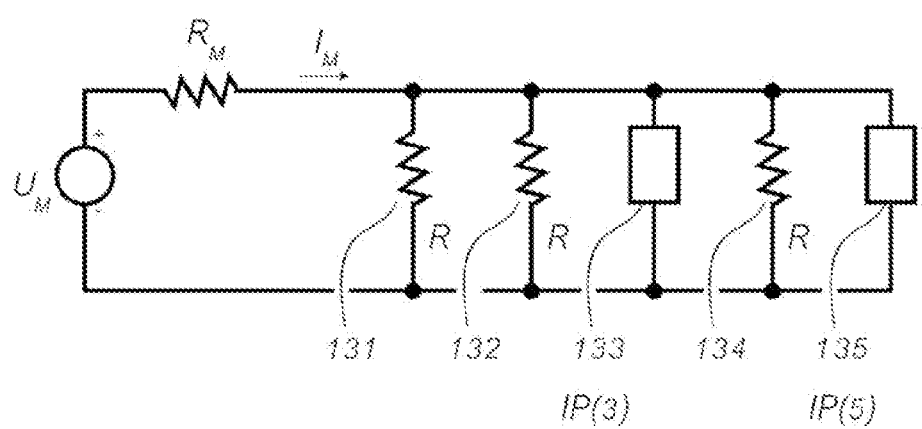
FIG. 6 represents an example with three malfunctioning and two functioning nodes.

An illustrative example is depicted in FIG. 6. A 'cold' start is assumed, i.e. no addresses have been distributed to the different nodes in the daisy chain represented in FIG. 6 being assembled of five network devices (131 until 135). In the example, nodes 131, 132 and 134 are malfunctioning. Nodes 133 and 135 are both operational. After the cold start, the switch (router) 100 requests to all devices to open their N switch means. In the example, only node 133 and node 135 respond to this request. This results in a disconnection of nodes 134 and 135 from the chain, due to the action taken by node 133.

At this moment, the switch/router measures the number of malfunctioning devices in the chain, which is two, meaning that node 133 is at location 3 in the daisy chain, preceded by two malfunctioning nodes, and that node 133 will receive address IP(3) upon the address assignment request. Thereafter, the router (switch) again requests to open switching means N of all devices that not received an IP address yet.

In this case, it is only device 135 which will disconnect the devices behind 135 in the chain. In this example, there are none. After the IP address assignment, node 133 closes again switch means N. The node 135 then requests an address. The router/switch assigns IP(5) to 135, since an additional defective node 134 was detected during this process. Because no other network devices issue a request for a new IP address, the process ends here. Only two network devices received an address, being function of the position in the chain.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for assigning a location-based network address to a network device in a network comprising:
   a plurality of network devices forming a daisy chain, said network devices comprising a communication device arranged for exchanging communication data with an application,
   a first connection device arranged for connecting in a first position a first terminal pair with said for exchanging communication data,
   a second connection device arranged for connecting in a first position a second terminal pair with said communication device arranged for exchanging communication data and an electrical circuit providing a connection with at least said first or said second connection device so that a connection can be established between said electrical circuit and at least one port of said first or second terminal pair when said first or second connection device is in a second position,
   said first and second connection device further arranged for being switched to interconnect in a bypass mode while having said electrical circuit in parallel in case of a malfunctioning network device, the method comprising the steps of:
   detecting in a switching device, based on a response signal received from said network, a change in topology of said network comprising a plurality of network devices by a change in the number of observed electrical circuits;

sending a command instructing at least one network device of said plurality having no location-based network address to open said second connection device;

receiving a request for assigning a network address from a network device of the at least one network device having no location-based network address yet;

measuring an electrical quantity of said response signal to determine the number of malfunctioning network devices in said daisy chain between said switching device and said network device from which said request was received;

assigning with said switching device a location-based network address to said network device from which said request was received, taking into account the number of said malfunctioning network devices.

2. The method for assigning a location-based network address as in claim 1, wherein said first and second connection means operate independently from each other.

3. The method for assigning a location-based network address as in claim 1, wherein said application controls said first and second connection means.

4. The method for assigning a location-based network address as in claim 1, wherein said electrical circuit is a resistor or a capacitor.

5. The method for assigning a location-based network address as in claim 1, wherein said electrical circuit is a single-wired flash device.

6. A network comprising a plurality of network devices forming a daisy chain, each network device comprising:

a first terminal pair for connecting a first transmit/receive wire pair;

a second terminal pair for connecting a second transmit/receive wire pair;

a communication device arranged for exchanging communication data with an application, said communication comprising a request for obtaining a network address;

a first connection device arranged for establishing in a first position connection between said first terminal pair and said communication device arranged for exchanging communication data;

a second connection device arranged for establishing in a first position connection between said second terminal pair and said communication device arranged for exchanging communication data;

wherein said network device further comprises an electrical circuit providing a connection with at least said first or said second connection device, so that a connection can be established between said electrical circuit and at least one port of said first or second terminal pair when said first or second connection device is in a second position, said first and second connection device further arranged for being switched to interconnect in a bypass mode while having said electrical circuit in parallel in case of a malfunctioning network device, said network further arranged for receiving a command instructing at least one network device of said plurality having no location-based network address to open said second connection device, for sending a request for assigning a network address from a network device of the at least one network device having no location-based network address yet and for sending a response signal comprising an electrical quantity allowing the determination of the number of malfunctioning network devices.

7. A transportation vehicle comprising a network as in claim 6.

* * * * *